US011057393B2

(12) United States Patent
Coffing

(10) Patent No.: US 11,057,393 B2
(45) Date of Patent: Jul. 6, 2021

(54) MICROSERVICE ARCHITECTURE FOR IDENTITY AND ACCESS MANAGEMENT

(71) Applicant: Cloudentity, Inc., Seattle, WA (US)

(72) Inventor: Nathanael Coffing, Seattle, WA (US)

(73) Assignee: Cloudentity, Inc., Seattle, WA (US)

( * ) Notice: Subject to any disclaimer, the term of this patent is extended or adjusted under 35 U.S.C. 154(b) by 93 days.

(21) Appl. No.: 16/051,114

(22) Filed: Jul. 31, 2018

(65) Prior Publication Data

US 2019/0273746 A1 Sep. 5, 2019

Related U.S. Application Data

(60) Provisional application No. 62/638,009, filed on Mar. 2, 2018, provisional application No. 62/643,468, filed
(Continued)

(51) Int. Cl.
*H04L 29/06* (2006.01)
*H04L 29/08* (2006.01)
*H04L 9/32* (2006.01)

(52) U.S. Cl.
CPC .......... *H04L 63/105* (2013.01); *H04L 9/3213* (2013.01); *H04L 63/0807* (2013.01); *H04L 63/20* (2013.01); *H04L 67/32* (2013.01)

(58) Field of Classification Search
CPC ........ H04L 63/105; H04L 63/20; H04L 67/32
See application file for complete search history.

(56) References Cited

U.S. PATENT DOCUMENTS

| 2014/0157351 A1* | 6/2014 | Canning ........... H04W 12/0027 |
| | | 726/1 |
| 2016/0124742 A1* | 5/2016 | Rangasamy ............ H04L 47/70 |
| | | 717/103 |

(Continued)

FOREIGN PATENT DOCUMENTS

WO    WO 2019/169405    9/2019

OTHER PUBLICATIONS

PCT Application No. PCT/US19/20603 International Search Report and Written Opinion dated May 23, 2019.
(Continued)

*Primary Examiner* — Farid Homayounmehr
*Assistant Examiner* — Suman Debnath
(74) *Attorney, Agent, or Firm* — George C. Rondeau, Jr.; Davis Wright Tremaine, LLP

(57) ABSTRACT

Systems and methods for identity and access management are provided in a service mesh that includes a plurality of interconnected microservices. Each microservice is associated with a microgateway sidecar. The associated microgateway sidecar may intercept a request for the associated microservice sent over a communication network from a user device. Such request may include data regarding a context of the request. A token associated with the request may be enriched based on the context data and sent to at least one other microservice. A database of security policies for each of the microservices may be maintained. An authentication engine may generate a risk profile for the request based on the context data of the request and one or more of the security policies in the database. One or more of a plurality of available security workflows may be selected based on the risk profile.

19 Claims, 6 Drawing Sheets

Related U.S. Application Data on Mar. 15, 2018, provisional application No. 62/652,299, filed on Apr. 3, 2018.

(56) References Cited

U.S. PATENT DOCUMENTS

| | | | |
|---|---|---|---|
| 2017/0331791 A1* | 11/2017 | Wardell | H04W 12/0609 |
| 2017/0364700 A1* | 12/2017 | Goldfarb | G06F 21/64 |
| 2018/0041515 A1* | 2/2018 | Gupta | H04L 63/102 |
| 2018/0063143 A1* | 3/2018 | Wilson | G06F 21/41 |
| 2018/0262573 A1* | 9/2018 | Przybylski | G06F 3/0484 |

OTHER PUBLICATIONS

PCT Application No. PCT/US19/20603 International Preliminary Report on Patentability dated Sep. 8, 2020.

\* cited by examiner

MICROSERVICE ARCHITECTURE FOR IDENTITY AND ACCESS MANAGEMENT

CROSS-REFERENCE TO RELATED APPLICATIONS

The present application claims the priority benefit of U.S. provisional patent application No. 62/638,009 filed Mar. 2, 2018, U.S. provisional patent application No. 62/643,468 filed Mar. 15, 2018 and U.S. provisional patent application No. 62/652,299 filed Apr. 3, 2018, the disclosures of which are incorporated by reference herein.

BACKGROUND OF THE INVENTION

1. Field of the Invention

The present invention generally relates to identity and access management. More specifically, the present invention relates to microservice architecture for identity and access management.

2. Description of the Related Art

Modern-day consumers have ever-increasing expectations that their service providers serve them in customized, efficient, and secure fashion. As such, even enterprises that have not traditionally been considered technical are now facing urgent technological demands in order to serve their customers. Such enterprises may rely on presently available identity and access management systems to authenticate and authorize certain users to access certain resources or services. Such an endeavor may become increasingly complicated, however, as enterprise systems and the resources and service provided become more complex, subject to more regulation, and/or targeted for theft, exposure of private data, or other kind of attack.

Moreover, the information technology environment is continually evolving, and security challenges have become more difficult in view of recent trends like bring-your-own-device, cloud computing, mobile applications, Internet of Things, prioritizing user experience, and an increasingly mobile workforce. There are more devices and services to be managed than ever before, along with diverse requirements for associated access privileges. As individuals migrate through different roles in an enterprise or the customer experience, it becomes increasingly complex and challenging to manage identity and ensure appropriate access to resources across progressively more heterogeneous technology environments. Such technical challenges may arise from the different types of information to be tracked, different policies to be enforced, and the distributed data storage systems from which that information may be managed, updated, and retrieved. Further complicating the challenge is the expectation of a certain standard of customer service, delivery of tailored customer experiences in real-time (or near real-time), and that such software features will continue to stay abreast with the current technical environment, which may rapidly develop and improve over time.

Further, many presently available identity and access management systems are part of large monolithic systems and/or are monolithic themselves. Such monolithic enterprise systems are generally inflexible, unagile, and as a result, slow to adapt and respond to change. Moreover, such monolithic legacy architectures may further lack scalability, face increased times to market, increased acceptance testing requirements, and are unable to manage security risks in any tailored way. Developing and deploying updates, for example, in such systems may require extensive development and testing times that leave the system outdated and vulnerable in the interim. In particular, monolithic identity and access management systems may become highly strained when tasked to operate with rapidly growing microservices architectures. Increasingly, however, many new applications are being developed as microservices, themselves which heighten the need for identity and access management systems adapted to that infrastructure, including being capable of managing the security of application-to-application (A2A) or workload-to-workload transactions.

In addition, different business groups or departments within a single company may be responsible for dealing with different types of transactions, and as such, may develop discrete identity and access management tools specific to their particular needs and transaction requirements. A company with many different departments may lack a unified set of security policies or even a unified set of records (e.g., a single user may be associated with multiple different records from different departments).

Moreover, such legacy identity and access management systems are not equipped or only ill-equipped to interact securely with the cloud, which decreases their speed, efficiency, and flexibility. Such systems further lack the ability or face serious obstacle in using or integrating with existing modern-day cloud-based tools and resources.

There is therefore a need in the art for improved systems and methods for identity and access management.

SUMMARY OF THE CLAIMED INVENTION

Embodiments of the present invention provide a microservices-based architecture for identity and access management functions. Systems and methods for identity and access management are provided in service mesh that includes a plurality of interconnected microservices. Each microservice is associated with a microgateway sidecar. The associated microgateway sidecar may intercept a request for the associated microservice sent over a communication network from a user device. Such request may include data regarding a context of the request. A token associated with the request may be enriched based on the context data and sent to at least one other microservice. A database of security policies for each of the microservices may be maintained. An authentication engine may generate a risk profile for the request based on the context data of the request and one or more of the security policies in the database. One or more of a plurality of available security workflows may be selected based on the risk profile.

Various embodiments of the present invention include systems for microservices-based identity and access management. Such systems may include a plurality of interconnected microservices and a microgateway sidecar associated with each of the microservices. Such a microgateway may intercept a request for the associated microservice sent over a communication network from a user device and that includes data regarding a context of the request, enriches a token associated with the request based on the context data, and sends the enriched token to at least one other microservice. Systems may further include an authorization engine that accesses a database of security policies for each of the microservices, generates a risk profile for the request based on the context data of the request and one or more of the security policies in the database, and selects one of a plurality of available security workflows based on the risk profile.

Further embodiments include methods for microservices-based identity and access management. Such methods may include deploying a plurality of interconnected microservice each associated with a microgateway sidecar, intercepting at the associated microgateway sidecar a request for the associated microservice sent over a communication network from a user device and that includes data regarding a context of the request, enriching a token associated with the request based on the context data, sending the enriched token to at least one other microservice, accessing a database of security policies for each of the microservices, generating via an authentication engine a risk profile for the request based on the context data of the request and one or more of the security policies in the database, and selecting one of a plurality of available security workflows based on the risk profile.

Yet further embodiments of the present invention include non-transitory computer-readable storage media having embodied thereon programs executable to perform the methods disclosed herein.

DETAILED DESCRIPTION

Figure 1:
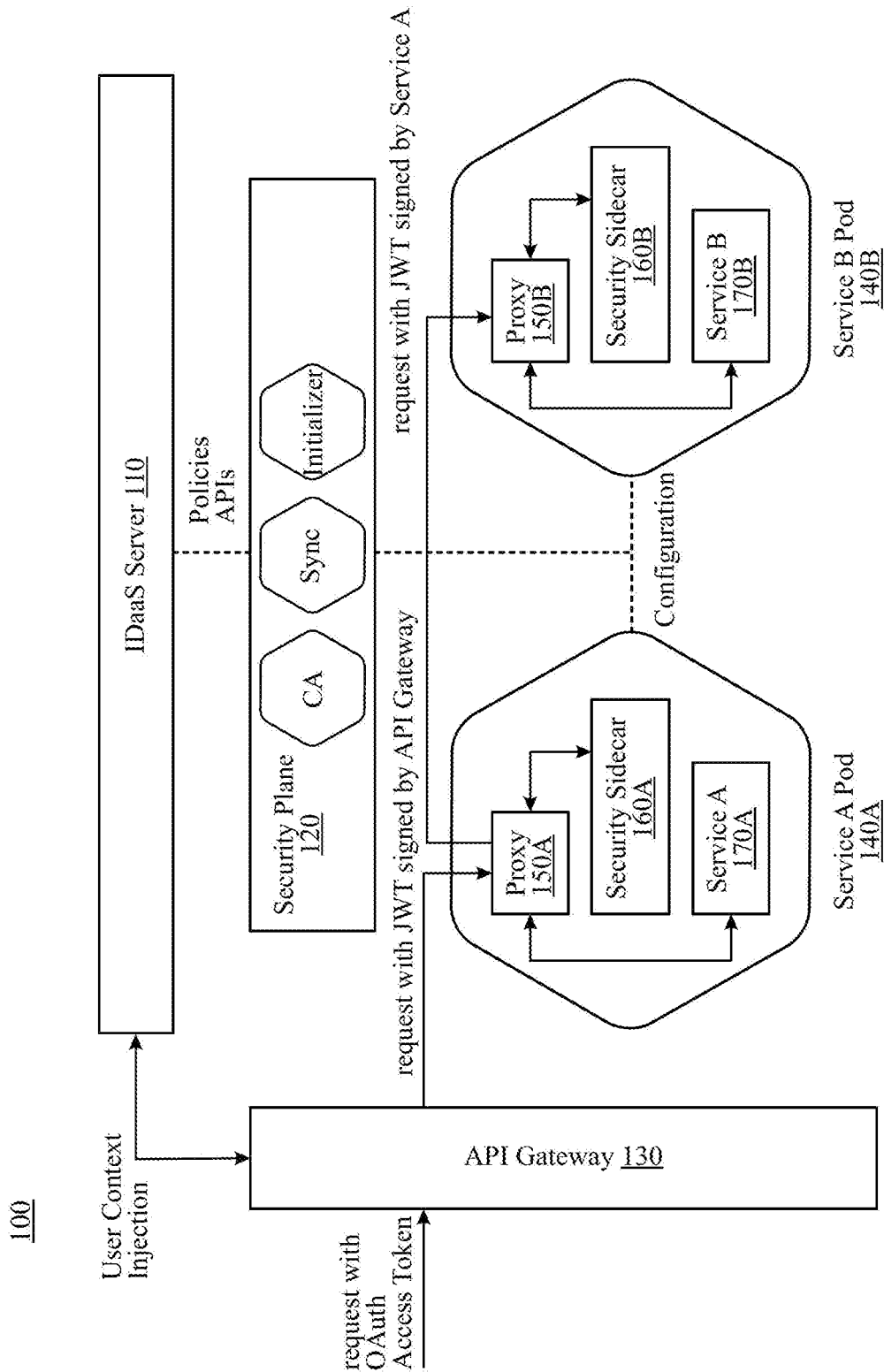
FIG. 1 illustrates a simplified network environment in which systems for microservices-based identity and access management may be implemented.

Embodiments of the present invention include identity and access management systems that deliver a comprehensive stateless identity solution built from the ground up on a cloud-native microservices architecture with representation state transfer (RESTful) APIs that provide for online interoperability, per-transaction authentication, and per-resource authorization. Microservices architectures can be contrasted with centralized architectures, which are designed as a single, autonomous unit. For example, in a client-server model, the server-side application receives HTTP requests, executes logic, and returns data. In centralized architectures, a minor modification may require developing and deploying an entirely new version of the system. Microservice architectures allow small changes to be made within one or more of the services without having to make changes to other services. Various embodiments may further incorporate modern container architecture and may operate as either cloud-native, hybrid cloud, or multi-cloud architectures, as well as with legacy architectures.

Because identity and access management systems can be deployed in microservices themselves, comprehensive identity and data security may therefore be provided to multiple interconnected application microservices, collectively forming one or more meshes. Such a service mesh may further provide for self-discovery, self-configuration, self-organization, and peer-to-peer communications. Moreover, reliable service-to-service communication and request routing may be provided via network proxies (e.g., sidecars) deployed alongside the respective application code (e.g., main container) in complex mesh topologies, as well as provide for service discovery, scalability under load, and network resilience. The perimeter is therefore defined by software rather than machine or location, thereby allowing for customization (e.g., human-organization) of network domains. Moreover, edge-style computing—where data and processing may be pushed to the edge device—may be facilitated so that operations may occur even when offline.

An exemplary identity and access management system that is deployed in microservices may include a microservice mesh security plane that co-exists and augments microservice mesh data and control planes, which provides for a bridge between identity, API management, and microservice mesh realms. By bridging identity, API management, and microservice mesh, such a system gives companies and enterprises the ability to build truly secure distributed microservices environment with proper controls as needed and with end-user identity context passed to microservices for a customized user experience.

A microservice architecture provides for rapid development of software applications as a suite of independently deployable, small, modular services in which each service application runs a unique process and communicates through a well-defined, lightweight mechanism to serve a defined goal. Examples of protocols used for communication between the services include HTTP/REST (Representational State Transfer) with JSON or Protobuf. Each microservice may communicate with one or more other microservices and may each be subject to different identity and access policies. Rather than rely on a central identity and access management system, however, each microservice may be deployed with its own security sidecar to manage identity and access security, allowing for security controls as each microservice is activated, operated, and deactivated. Each security sidecar, which may be installed automatically with each application microservice container, may manage such identity and access management functions as signing/verification of security keys, policy synchronization, authentication, authorization of all incoming requests, as well as a transparent generation of security tokens for outgoing requests. As deployed via microservice, such identify and access management functions—e.g., token signing & verification, policy enforcement and policy decisions—may occur in a stateless fashion close to the relevant microservice so as to minimize latency.

Various embodiments of a identify and access management system deployed via microservice may include a pluggable microgateway that provides the ease and security that legacy perimeter security like traditional API gateways provided for data centers and monolithic applications, adapted to modern microservices, service mesh deployment models, and capable of custom transformation via configurable plugins. Such a microgateway can be deployed, updated, and configured with each microservice as a singular package. Such microgateway may further offload security requirements from a company's developers who no longer have to code microservice specific security aspects. Instead, a single logical security "pod" may be provided for each microservice (or small domain of microservices) that is protected by a dedicated microgateway. Application development teams may therefore be freed to focus on productspecific functionality, as the microgateway handles security requirements such as user authentication, service authentication, dynamic authorization, access delegation and credentials exchange (e.g., OAuth, SAML, OIDC), transaction throttling, TLS and secret offload, brute-force protection, service discovery, service configuration, canary routing, and distributed PDP/PEP. As such, a combination of user and microservice identities allows for application of effective security controls at the end-service level, as well as at each microservice level that is part of the mesh. In addition, user context may be injected into each microservice while keeping them separate from the end-user session type.

Further, end-to-end identity and security functionality may be provided via a variety of different microservices relating to identity and access management, encompassing full lifecycle management of users/services/things (i.e., from Internet of Things (IoT)), user self-service, strong authentication, and session mobility. Such microservices may also be used with an intelligent authorization engine that uses behavioral machine learning/artificial intelligence to deliver continuous adaptive authentication, authorization, and relationship management between users/services/things. Such an intelligent authorization engine may employs a unique adaptive risk-based transaction authorization approach to dynamically assess and score risk across user roles, transactional context, and real-time risk profiles weighing a variety of different factors for maximum protection in a customized manner (e.g., dynamic workflows to mitigate risk). Such an intelligent authorization engine may therefore dynamically detect changing risk probabilities across behavioral, data security and threat intelligence, escalating identity requirements for authorization on higher risk transactions while detecting, mitigating and blocking nefarious users, devices, or activities. The authorization engine's dynamic authorization is available for every transaction, from the initial user authentication to every application-to-application transaction, while maintaining user context, solving complex microservices security, and audit issues. Further, high-level security and visibility may be provided to the inter-service transactions.

As discussed, the microservices-based architecture allows for unified identity and data security and risk management, integrated security infrastructure, and continuous authorization for continuous integration and continuous delivery (CI/CD) development environments. Where a company may wish to incorporate some aspects of legacy systems, present embodiments may further provide for token exchange services, which allows for session authorization tokens to be created and/or verified between the systems.

FIG. 1 illustrates a simplified network environment 100 in which systems for microservices-based identity and access management may be implemented. As illustrated, an exemplary system may include an IDaaS (identity-as-a-service) server 110, security plane 120, API gateway 130, and microservices deployed in service A pod 140A and service B pod 140B. Each service pod 140 may further each include proxy 150, security sidecar 160, and respective code for providing a respective service 170.

IDaaS server 110 may provide a platform for managing microservices, OAuth applications, multi-tenant identity, authorization, and authentication with delegation and administration features. IDaaS server 110 may be installable in the cloud or on-premises and used to control security plane 120 in all microservice environment.

Security plane 120 is illustrated as including a Certificate Authority (CA), Sync, and Initializer modules. The CA (e.g., Vault) may allow for reading and generation of dynamic digital certificates corresponding to security keys. Sync allows for registration of microservices, as well as synchronization of policies and APIs configuration. Initializer allows for injection of a proxy 150A-B and security sidecar 160A-B into the respective service A and B pods 140A-B, as well as triggers generation of a new digital certificate upon deployment.

API gateway 130 may serve as an entry point to the service mesh. API gateway 130 may expose public endpoints using OAuth token for authentication and inject user context via a token (JWT) to proxied requests signed using a private key issued exclusively for the API gateway 130 by internal CA in security plane 120. API gateway 130 can enforce rich policies that can be created in IDaaS server 110 based on such factors as user attributes, roles, relationships, session attributes, current location, device information, authentication methods used, and risk factor of a transaction user or a device.

Service pods 140 may be any type of microservice known in the art. Each service pod 140 includes a proxy 150, a security sidecar 160, and code or application 170 specific to each microservice.

Proxy 150 may be any intelligent HTTP proxy that provides dynamic service discovery, load balancing, circuit breakers, traffic routing, metrics and more. Such proxies 150 may be extended with a plugin that calls security sidecar 160 to validate and transform requests.

Security sidecar 160 allows in-place validation of policies (enforcement and decisions) for incoming requests and transformation of outgoing requests. In certain default scenarios, security sidecar 160 may validate if incoming requests were signed using a key generated by internal CA and inject a token (JWT)-signed using a private key of a microservice. The user context may be propagated between microservices via JWT.

Figure 2:
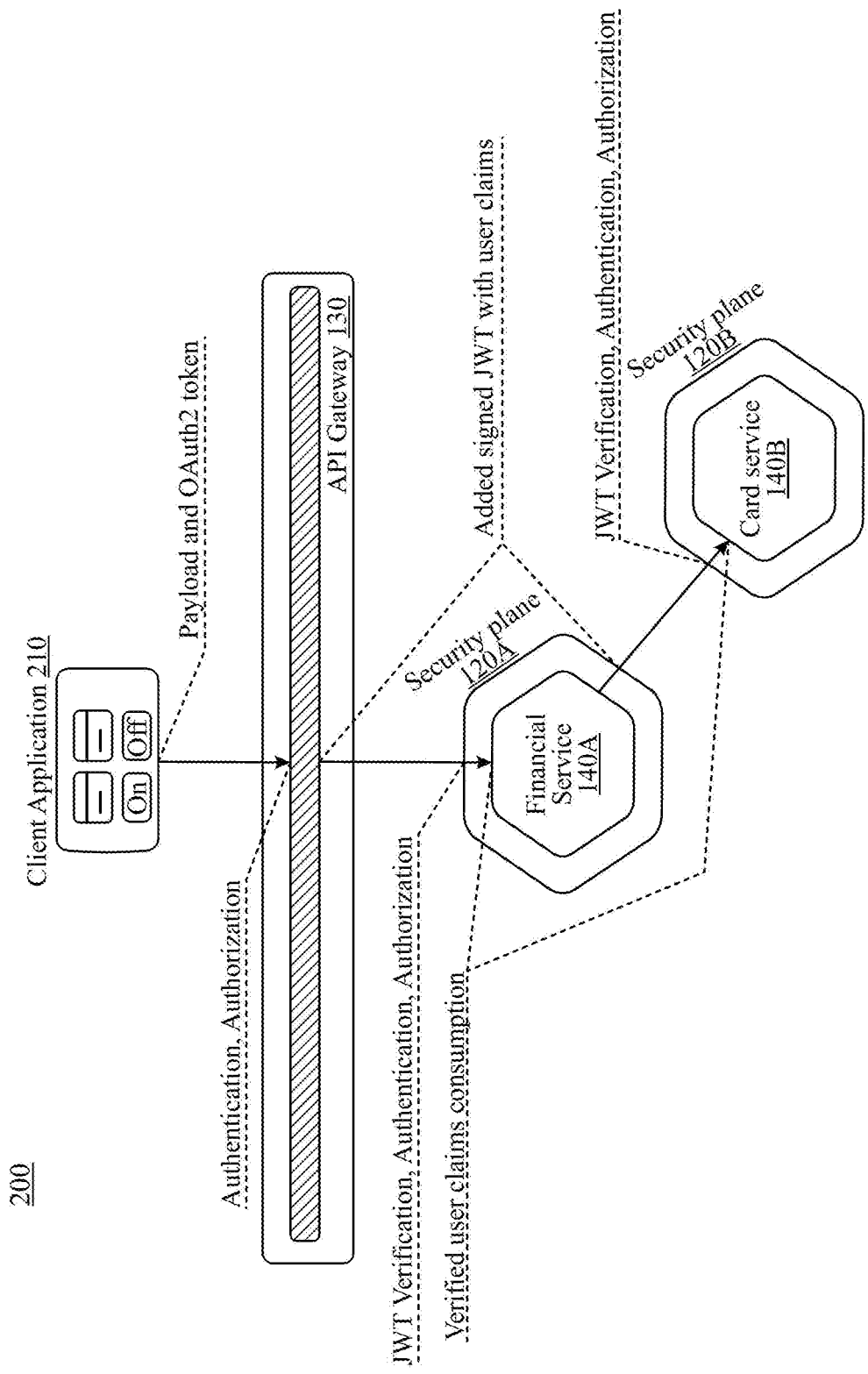
FIG. 2 illustrates an exemplary network environment in which systems for microservices-based identity and access management may be implemented.

FIG. 2 illustrates an exemplary network environment 200 in which systems for microservices-based identity and access management may be implemented. Building upon the basic components discussed in relation to FIG. 1, the network environment 200 is illustrated as further including a client application 210, API gateway 130, and microservices 140A-B with respective security planes 120A-B. As illustrated, one microservice 140A may correspond to certain financial services, while the other microservice 140B may correspond to credit card services. Although only two microservices 140A-B are illustrated, service meshes may include any number of further microservices. For example, microservices 140A (financial services) may call a number of further microservices 140B-N and expose a number of types of APIs.

The client application 210 may be a web application that may be accessible and visible via a web browser. Such a client application 210 may trigger a request (e.g., by a button click). Such request may contains a payload and the access token (e.g., in the request header). The API gateway 130 may authenticates the call and perform authorization, not only checking the scope of authorizations but also invoking all other policies associated with the API. Upon successful authentication and authorization, the request may then be proxied to the appropriate microservice 140 in the mesh with added JWT token that has been enriched with user data (e.g., from payload). Since the API gateway 130 is a microservice itself, API gateway 130 may be aware of other microservices 140A-N in the network. API gateway 130 may further sign the JWT token with its individual private key (e.g., generated with Vault), so that other microservices can verify the signed JWT token and identify the microservice.

Each microservice 140A may be secured by a respective security sidecar (e.g., security sidecar 160 of FIG. 1). Each incoming and outgoing request may be proxied (e.g., through Linkerd™ Proxy) before reaching a target microservice 140 or going outside of a microservice 140. The proxy may use a security plugin to validate each incoming request and to transform each outgoing request. An exemplary incoming request may be received by the proxy, which may then call on security sidecar 160 to validate a request. Security sidecar 160 may look for a policy rule that matches the request and then validate one or more policies for the request. Security sidecar 160 may further check if the incoming JWT token is valid and signed using the key that was issued by the Certificate Authority (Vault). The proxy may evaluate the validation result. When authorized, the proxy may then provide the request to the target microservice 140. When unauthorized, the proxy may return a 401 HTTP status.

Outgoing requests may likewise be proxied. The proxy may call security sidecar 160 to transform an outgoing request. Security sidecar 160 may then execute a chain of HTTP request transformers. By default, security sidecar 160 may inject a JWT token signed using the private key that is assigned to the target microservice 140 as an HTTP header. The proxy may then modify the outgoing request.

Figure 3:
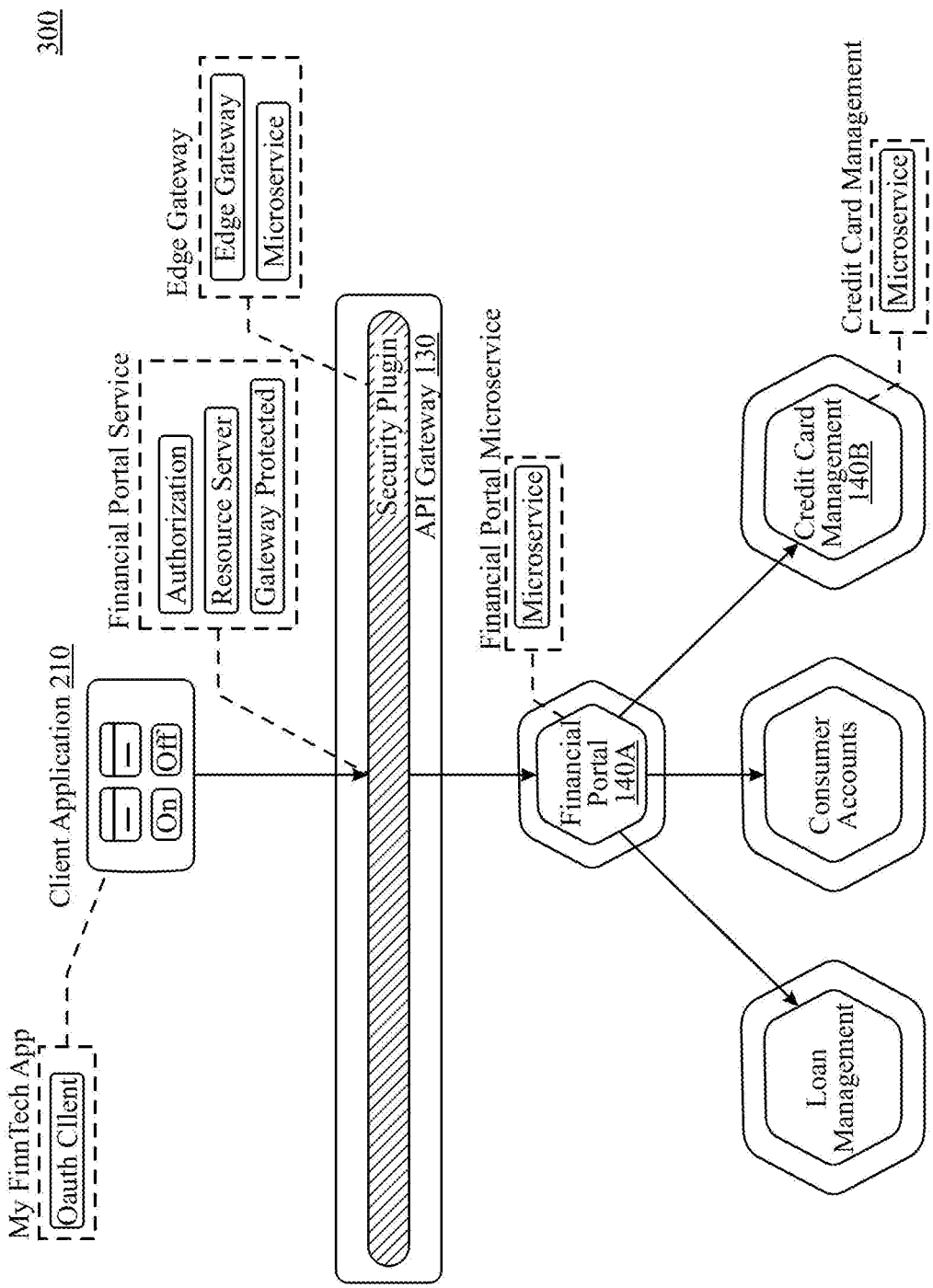
FIG. 3 further illustrates the exemplary network environment in which systems for microservices-based identity and access management may be implemented.

FIG. 3 further illustrates the exemplary network environment 300 in which systems for microservices-based identity and access management may be implemented. Adding further detail to the network environment 200 of FIG. 2, network environment 300 illustrates that client application 210 may be associated with a specific application (e.g., "My FinnTech App") associated with a specific type of client authentication (e.g., OAuth). Such client application 210 may send a call to API gateway 130, which may use certain microservices (e.g., Financial Portal Service used for functions such as authorization, access resources, and gateway protection, Edge Gateway used to provide an entry point to the mesh and contain gateway protected API rules).

IDaaS server 110 (e.g., from FIG. 1) may allow for multi-tenancy, delegated administration, and control of multiple meshes. IDaaS server 110 further provides for discovery of new microservices. Financial portal 140A may be associated with a resource server that exposes certain requested resources, but as a gateway-protected application, the gateway may also expose APIs to be managed and configured (e.g., through a swagger import). Since the APIs are exposed by one of the microservices 140, the target microservice 140A may be selected to which requests are to be proxied. As the API gateway 130 is itself a microservice and aware of other microservices, the target microservice may be selected from the list of all microservices using the selection field above the APIs. Each API also has the option to be associated with one or more policies. When the first API is invoked, the selected policy associated therewith may be verified. The policy can also be managed in the policies tab on the resource server.

The policy may specify and used to verify that the request is coming from the financial service and whether application that made the call to the API gateway 130 on the user's behalf has been given permission by the user to access the resources (e.g., certain authorization scope), as well as whether the user had been earlier assigned the permission to be able to grant the same to the application. The entire policy verification may occur within milliseconds in the security sidecar 160 that intercepts the calls.

Figure 4:
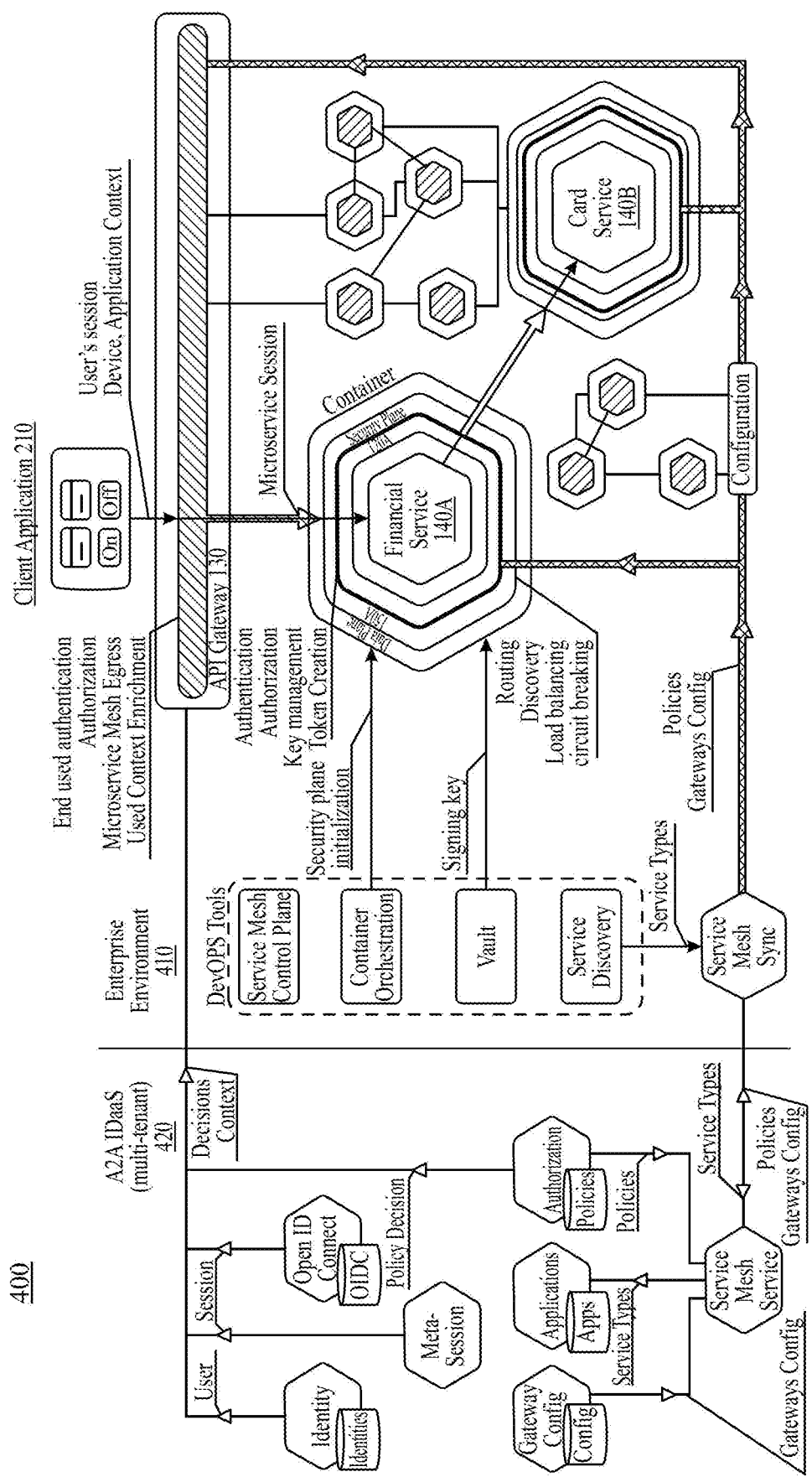
FIG. 4 yet further illustrates the exemplary network environment in which systems for microservices-based identity and access management may be implemented.

FIG. 4 yet further illustrates the exemplary network environment 400 in which systems for microservices-based identity and access management may be implemented. The network environment 400 of FIG. 4 provides a more detailed and complex view of the service mesh. Network environment 400 illustrates that the service mesh may include an enterprise environment 410 and an IDaaS server environment 420. While sharing some components of the network environments 100-300 described with respect to FIGS. 1-3 (e.g., API gateway 130, microservices 140A-B, client application 210), enterprise environment 410 illustrates a few different details.

As noted previously, client application 210 may allow a user device to establish a session and provide certain data (e.g., regarding the user device, application context) to API gateway 130. API gateway 130 may provide for end-user authentication, authorization(s), microservice mesh egress, and user context enrichment (e.g., via tokens injected/enriched with user and other related contextual data). API gateway 130 may further open a microservice session with any of a number of different microservices 140, including financial service 140A, which is illustrated with its respective security plane 120 and data plane (e.g., proxy 150A) within the container of the microservice 140A. The security plane 120A may further be associated with specified authentication, authorization key management, and token creation functions, while the data plane (e.g., proxy 150A) may be involved with routing, discovery, load balancing, and circuit breaking. Enterprise environment 410 may also be provided with certain development tools (e.g., DevOps tools), including service mesh control plane, container orchestration (e.g., used for security plane initialization), Vault (e.g., used to sign keys), and service discovery.

IDaaS server environment 420 is a multi-tenancy that maintains information regarding users (e.g., various identities/records associated with each specific user), sessions (e.g., OpenID connect authentication standards), meta-sessions, gateway configurations, applications/microservices, and authorization policies. Such user, session, and meta-session data may be considered in conjunction with authorization policies to arrive at a context-specific decision (e.g., regarding whether client application 210 is allowed a level of access to specified resources under currently applicable circumstances) via API gateway 130. In addition, the gateway configuration information and authorization policies may be provided via service mesh service to service mesh sync (in enterprise environment 410) in accordance with specified service types.

Figure 5:
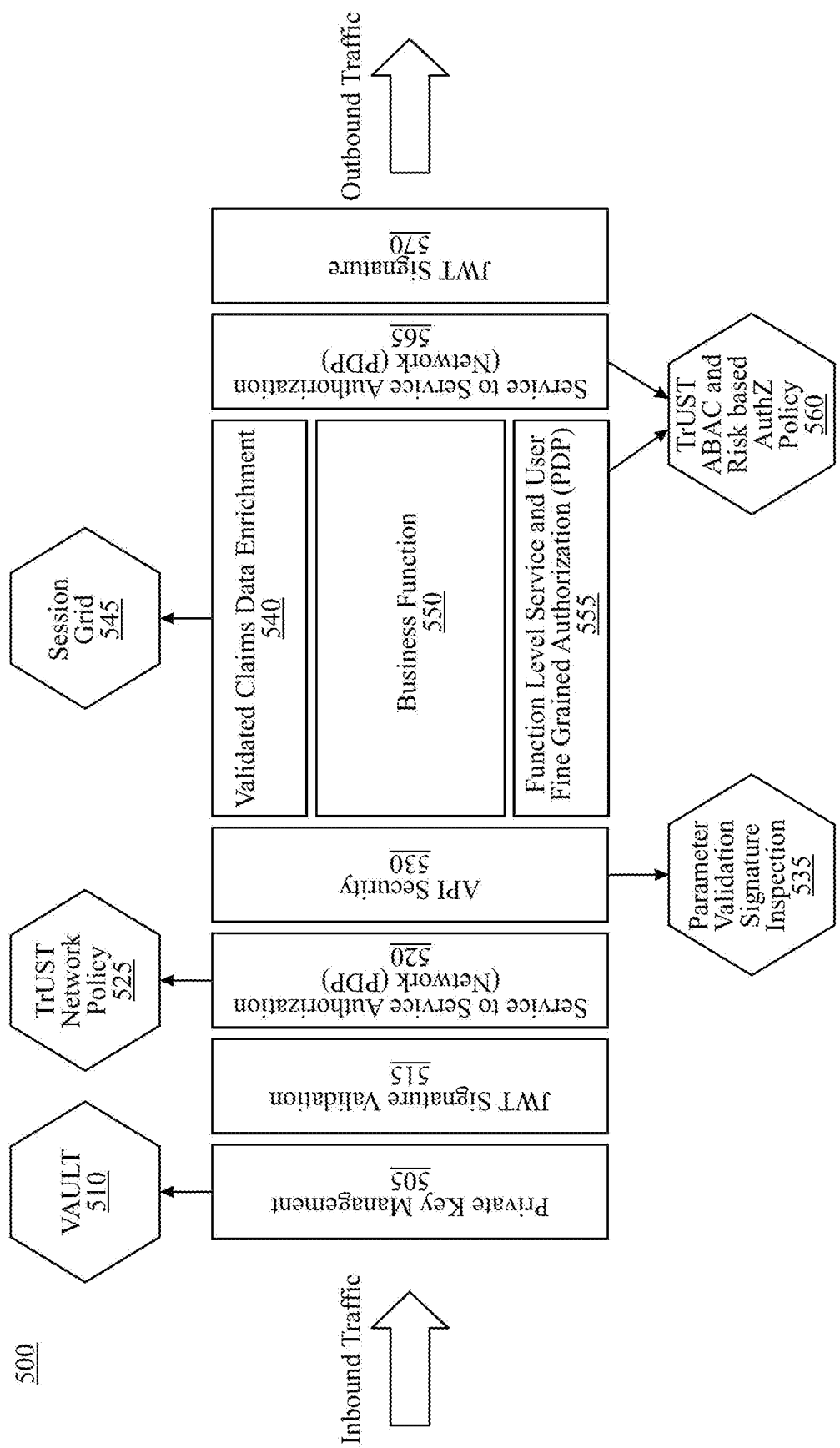
FIG. 5 is a flowchart of an exemplary microgateway method in microservices-based identity and access management.

FIG. 5 is a flowchart of an exemplary microgateway 500 method in microservices-based identity and access management. As noted previously, a microgateway 500 may be specific to a certain microservice. As illustrated, microgateway 500 may receive inbound traffic, which may include a request that includes a security key and a JWT token from the sender. The security key may be evaluated by private key management in step 505, which may involve communication in step 510 with Vault or other certificate authority, which signed such key. In step 515, the signature on the JWT token may be validated, and in step 520, service-to-service authorization/network PDP 520 may determine whether authorization exists for a call to another service. Such determination may be based on network policies retrieved (e.g., from a designated (TrUST) store) in step 525. API security measures may be taken in step 530, which may involve parameter validation signature inspection in step 535. The JWT token may be enriched by user data from validated claims of the incoming request in step 540 and be communicated to the session grid in step 545. The business function (e.g., providing the microservice) may be executed in step 550, and function-level service and user fine-grained authorization (PDP) may be performed in step 555 and combined with further service-to-service authorizations 565 to result in an attribute-based access control and risk-based authorization policy 560. The JWT token may be further signed 570 in outbound traffic.

The microgateway 500, which may be executed as a sidecar to the microservice function or in an API gateway. The microgateway 500 may integrate workload identity/access control, API security/access control, and user identity/access control in a very small package that protects any microservice, container, or function with a common transaction ID. Workload identity may further provide attestation, identity assignment, and authentication between workloads and micro-segmentation based on a distributed policy decision point. An API security layer may extend the security presence further with API definition matching, parameter validation, and security signature checking for the incoming transaction. Finally, the user identity and access control portion of the microgateway allows microservice functions to externalize their data needs, fine-grained authorization requirements and even governance, risk management, and compliance (GRC) requirements to the microgateway.

Figure 6:
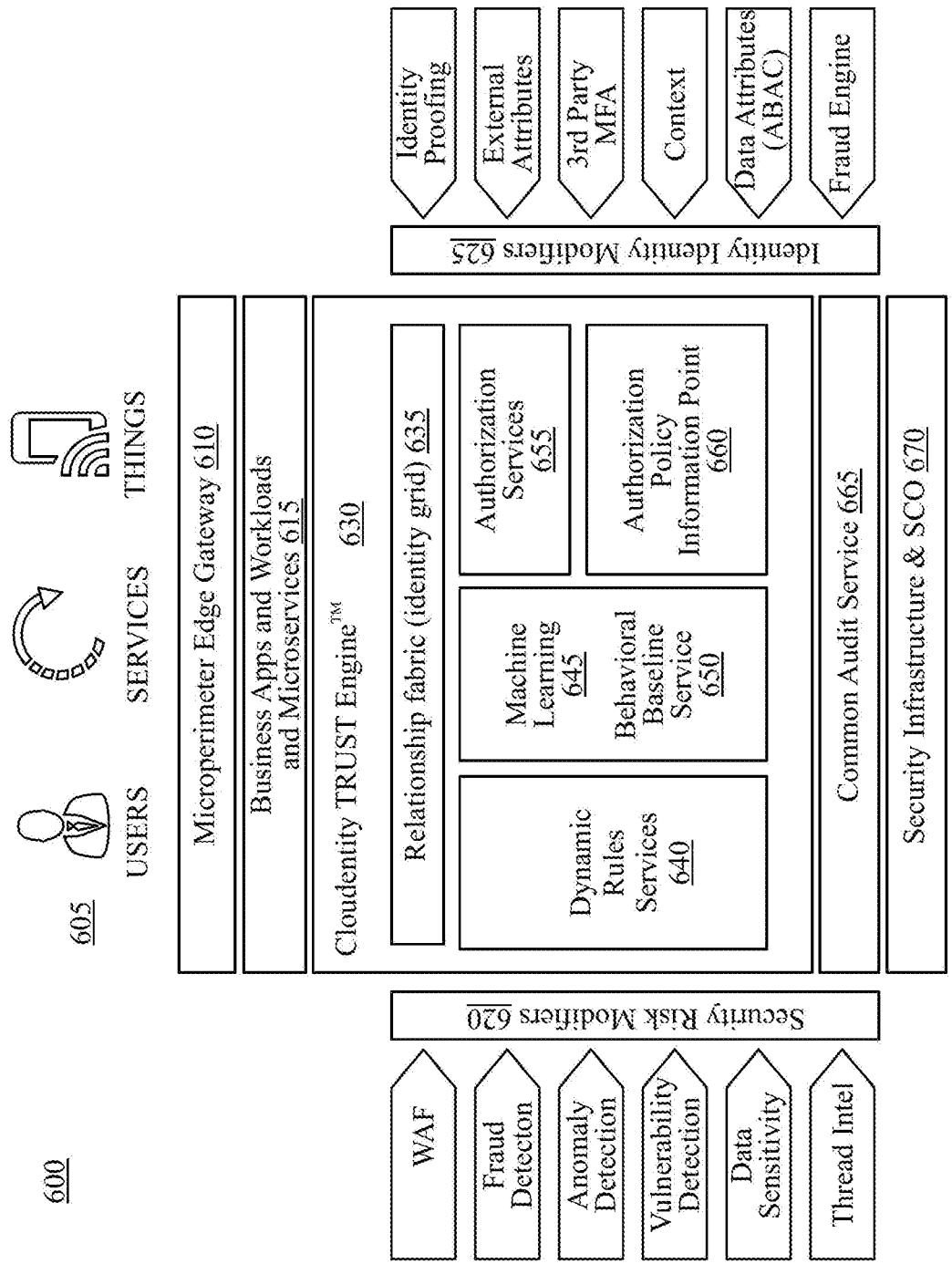
FIG. 6 is a diagram of an exemplary authorization engine that may be used in systems for microservices-based identity and access management.

FIG. 6 is a diagram of an exemplary authorization engine 600 that may be used in systems for microservices-based identity and access management. Authorization engine 600 (e.g., Cloudentity TRUST Engine™) may be executed to evaluate risks in transactions conducted by various users, services, and things (e.g., IoT devices) 605. Such users/services/things 605 may enter the service mesh via a portal associated with microgateway (e.g., Microperimeter™ edge gateway) 610. Users/services/things 605 may wish to access one or more microservices (e.g., business apps & workloads & microservices) 615, each of which may be associated with different security and authorization policies (described above in relation to FIG. 5) directed at not only granting or denying access, but also evaluating and scoring various attributes for risk. In addition to the specific attributes discussed above, further factors may be considered, including security risk modifiers 620. Such security risk modifiers 620 may be provided from web application firewalls (WAFs), fraud detection systems, anomaly detection systems, vulnerability detection systems, data sensitivity systems, and threat intel sources. Further factors may include identity modifiers 625, such as identity proofing systems, external attributes, third party multi-factor authentication (MFA), context, data attribute-based access control (ABAC), and fraud engines.

Such factors may be received and evaluated by the authorization engine 630, which maintains a relationship fabric (identity grid) 635 for each user/service/thing 605. Further, authorization engine 630 may include dynamic rules services 640, machine learning 645, behavioral baseline services 650, authentication services 655, authorization policy information point 660, and audit services 665. Dynamic rules services 640, machine learning 645, behavioral baseline services 650 may collectively provide for artificial intelligent refinement of the rules or policies applied over time as more data and feedback is received. Meanwhile, authentication services 655 and authorization policy information point 660 may collectively provide for context-specific risk assessments of specific transaction requests as discussed in further detail below, audit services 665 may provide each transaction with a comprehensive digitally signed compliance audit trail from authentication to data access via unique individual transaction IDs and verified claims available to applications, microservices, APIs, containers and server-less functions for frictionless fulfillment of governance and compliance requirements.

Relationship fabric (identity grid) 635 refers to an interwoven collection of discrete identity elements for each user that may be collectively used to track and infuse identity attributes (and rights) throughout the distributed infrastructure. As such, relationship fabric (identity grid) 635 may maintain unique identifiers for each user/service/thing 605 and may be associated with profile information, such as user names, passwords, contact information, biometric information, user authorization levels, user roles, user behavior metrics, user access history logs (e.g., records of previously accessed resources, circumstances of access, and actions taken), resource protection levels associated with each of the plurality of different protected resources, user-associated devices, etc. The user biometric information may include voice print, a facial image, a retinal image, a fingerprint, a hand print, a signature, or any combination thereof. The respective biometric dataset for a user may be used to verify the user's identity (e.g., as part of a step-up authentication measure used for risk mitigation). Such biometrics and similarly unique parts of the dataset can also be used during the request handling.

The user access history logs may include historical data representing collected information pertaining to a plurality of past transactions associated with the user 605. Such history logs may further include identification of the device used for the transaction, geographic location of the device during the access, as well as other contextual information that may be used to further identify the user, the accessing device, and/or assess a risk level for a request to access a particular resource submitted from the user. The user access history logs may also be used to determine access patterns to protected resources by particular users and/or particular devices, as well as to identify resource access permissions previously granted to users along with relevant contextual factors based upon which such resource access permissions were granted. The user behavior information may include data representing a plurality of different user behavior metrics, including access patterns.

In some exemplary embodiments, the profile information may further include device information such as device addresses, device identification numbers, device labels, electronic serial number (ESN), an International Mobile Equipment Identity (IMEI) number, or an mobile equipment identifier (MEID), device-print (e.g., based on an ongoing capture of the installed applications/hardware, system settings, device history), device session identifier, device behavior, programs, application data, sensor data; historical data related to device usage by the associated user(s), and any other contextual information. The level of recognition of the device can also be considered part of the risk profile.

Authorization policy information point 660 may store user authorization level information representing a plurality of different policies governing permission to access a protected resource or microservice. Such policies may refer to manner of access, level of trustworthiness, roles, level of protection, and other factors discussed herein. Applying policies in a context-sensitive manner, however, may involve real-time risk profiles/scoring on a transaction basis, as well as step-up authentications on a transactional basis and risk mitigation by combining behavioral baseline and risk attribute decision access control into a non-binary authorization platform. In some embodiments, the authorization engine 630 may also work directly with existing data security appliances to generate real-time (or near real-time) risk profiles based on a combination of identity data and data security data and share such risk profiles globally with other session stores. The authorization engine 630 may also be able to query other external policy decision points, including existing access management platforms and to incorporate contextual data (e.g., location) into the authorization decision. For example, the General Data Protection Regulation (GDPR) of Europe places limits on what user attributes may be released to the underlying application based on European location(s) where the data resides and/or is transmitted.

For example, a specific requested transaction (e.g., user purchase of an item at a location) may be evaluated and weighed in terms of different attributes (e.g., identity of the user, device used, price of purchase, type of item, user purchase history, location of vendor/seller, location of bank) in order to construct a risk profile. The information in the request may include, for example, unique device identifiers and location data specifying geographic location information. The location data may be utilized to determine or identify locations of the client systems within, for example, a geographic area or a building structure. The location data may be provided by, for example, global positioning system (GPS) transceivers embedded within the client systems. Different levels of trust may be assigned based on the type and content of information provided, including user location, device identifier, authorization level-request, security monitoring data, user input (e.g., secrets), biometrics, behavior metrics, web-access firewalls, geo-fences, etc. Moreover, such data may be used in risk mitigation as discussed further herein.

A risk profile may be constructed based on such data and may further serve as the basis for specified workflows involving different risk mitigation tasks. A risk profile indicating extremely low risk levels overall (e.g., below a predetermined minimum threshold) may be allowed to proceed without further risk mitigation, while a risk profile indicating extremely high risk levels (e.g., above a predetermined maximum threshold) may be denied notwithstanding any available risk mitigation workflows.

Other risk profiles may be subject to different types of workflows based on the type of risk indicated, as well as the level of that risk. Different thresholds may therefore be set for different risk types and may correspond to different workflows. Such thresholds and workflows may further be customized for the enterprise, as well as updated over time. A risk profile that casts doubt on the identity of the requesting user, for example, may trigger a workflow designed to verify user identity (e.g., passwords, biometric verification), while a different risk profile may attach based on price, location, etc., and trigger a different risk mitigation workflow (e.g., email or phone confirmation). A risk profile may include dynamic risk value/level based on any attributes discussed above, and in response to such levels of risk, the authorization engine 630 may also trigger corresponding workflows to mitigate risk. Applications and/or organizations can set the risk level available to the transactions. That risk level may then be compared to the risk level generated by the behavioral//baseline and existing security devices. Depending on how the risk level aligns with the policy, the policy allows mitigation of that risk through a discrete action, such as audit requests, a multi-factor authentication request, a patch device request, etc. The risk and the corresponding mitigation action can be defined applied to the user, device, thing, or even the service being used during the transaction. Such implementation provides dynamic and non-binary risk assessment and mitigation. In certain transactions, user attributes (e.g., user history) can be used to dynamically authenticate the user for certain access privileges. Workflows may prompt the user and/or the system to change certain statuses to improve the level of authorization for other types of access.

Because historical attributes regarding each transaction may be tracked over time, a behavioral baseline may be established with identified patterns and trends that allow for application of machine learning/AI in evaluation of future risk profiles. As such, authorization policies and their associated workflows may be dynamically refined over time to provide end-to-end security in accordance with context-specific factors.

Users and microservices are described herein are associated with computing devices capable of communicating over known communication networks. Data may be received directly from another computing device or may be received indirectly via one or more intermediary computing devices. Such computing devices may include end-user computing devices (e.g., mobile phones, tablets, laptops, desktop computers), servers, relays, routers, network access points, base stations, and the like.

The components contained in the computing systems performing the methods and functions disclosed herein are those typically found in computer systems that may be suitable for use with embodiments of the present invention and are intended to represent a broad category of such computer components that are well known in the art. Such computing components may include any variety of computing components known in the art, including memory, processors, and network communication interfaces. Further, the present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for identity and access management, the system comprising:
    a plurality of interconnected microservices;

a plurality of microgateway sidecars, each of the microgateway sidecars associated with one of the microservices, wherein one of the microgateway sidecars manages access to the associated microservice by:
   intercepting a request for the associated microservice sent over a communication network from a user device, wherein the request includes data regarding a user context of the request and an enriched token, wherein the token is enriched based on the user context data associated with profile information of a user of the user device,
   signing the enriched token using a private key associated with at least one other microservice, and
   sending the signed token to the at least one other microservice, wherein the at least one other microservice verifies that the token is valid and from the associated microservice based on the signature by the microgateway sidecar; and
an authorization engine that:
   accesses a database of security policies for each of the microservices,
   generates a risk profile for the request based on the user context data of the request and one or more of the security policies in the database, and
   selects one of a plurality of available security workflows based on the risk profile, wherein the selected security workflow includes sending one or more verification communications to the user device.

2. The system of claim 1, wherein each of the microservices is further associated with a proxy plugin that calls the associated microgateway sidecar to validate the intercepted request.

3. The system of claim 1, wherein the user context of the request includes attribute data regarding at least one of a user that submitted the request, a device associated with the request, a location associated with the request, and content of the request.

4. The system of claim 3, further comprising a database of user profiles, wherein a user profile associated with the user includes information regarding past requests and corresponding results.

5. The system of claim 4, further comprising a behavioral baseline service executable to analyze the user profile and develop a behavioral baseline model for the user.

6. The system of claim 5, wherein the authorization engine generates the risk profile further based on the behavioral baseline model for the user.

7. The system of claim 5, further comprising a machine learning module executable to modify one or more policies based on the behavioral baseline model.

8. The system of claim 1, wherein the generated risk profile identifies a type of risk and a level of risk, and wherein the selected security workflow includes one or more tasks to mitigate the identified type of risk and the identified level of risk, the tasks including sending the verification communications to the user device.

9. The system of claim 1, wherein the request is associated with a set of the microservices, each microservice in the set associated with a unique transaction identifier, and wherein the authorization engine further provides an audit trail for each microservice in the set, the audit trail associated with the associated unique transaction identifier.

10. A method for identity and access management, the method comprising:
   deploying a plurality of interconnected microservices and a plurality of microgateway sidecars, each of the microservices associated with one of the microgateway sidecars;
   managing, via one of the microgateway sidecars, access to the associated microservice, wherein managing access to the associated microservice includes:
      intercepting, via the associated microgateway sidecar, a request for the associated microservice sent over a communication network from a user device, wherein the request includes data regarding a user context of the request and an enriched token, wherein the token is enriched based on the user context data associated with profile information of a user of the user device,
      signing the enriched token via the microgateway sidecar using a private key associated with the associated microservice, and
      sending the signed token to at least one other microservice, wherein the at least one other microservice verifies that the signed token is valid and is from the associated microservice based on the signature by the microgateway sidecar;
   accessing a database of security policies for each of the microservices;
   generating, via authorization engine, a risk profile for the request based on the user context data of the request and one or more of the security policies in the database; and
   selecting one of a plurality of available security workflows based on the risk profile, wherein the selected security workflow includes sending one or more verification communications to the user device.

11. The method of claim 10, further comprising calling the associated microgateway sidecar to validate the intercepted request via a proxy plugin.

12. The method of claim 10, wherein the user context of the request includes attribute data regarding at least one of a user that submitted the request, a device associated with the request, a location associated with the request, and content of the request.

13. The method of claim 12, further comprising maintaining a database of user profiles, wherein a user profile associated with the user includes information regarding past requests and corresponding results.

14. The method of claim 13, further comprising executing a behavioral baseline service to analyze the user profile and develop a behavioral baseline model for the user.

15. The method of claim 14, wherein generating the risk profile is further based on the behavioral baseline model for the user.

16. The method of claim 14, further comprising executing a machine learning module to modify one or more policies based on the behavioral baseline model.

17. The method of claim 10, wherein the generated risk profile identifies a type of risk and a level of risk, and wherein the selected security workflow includes one or more tasks to mitigate the identified type of risk and the identified level of risk, the tasks including sending the verification communications to the user device.

18. The method of claim 10, wherein the request is associated with a set of the microservices, each microservice in the set associated with a unique transaction identifier, and further comprising providing art audit trail for each microservice in the set, the audit trail associated with the associated unique transaction identifier.

19. A non-transitory computer-readable storage medium, having embodied thereon instructions executable by a processor to perform a method for identity and access management, the method comprising:

deploying a plurality of interconnected microservices and a plurality of microgateway sidecars, each of the microservices associated with one of the microgateway sidecars;

managing, via one of the microgateway sidecars, access to the associated microservice, wherein managing access to the associated microservice includes:

intercepting, via the associated microgateway sidecar, a request for the associated microservice sent over a communication network from a user device, wherein the request includes data regarding a user context of the request and an enriched token, wherein the token is enriched based on the user context data associated with profile information of a user of the user device, signing the enriched token via the microgateway sidecar using a private key associated with at least one other microservice, and sending the signed token to the at least one other microservice, wherein the at least one other microservice verifies that the token is valid and from the associated microservice based on the signature by the microgateway sidecar;

accessing a database of security policies for each of the microservices;

generating, via an authorization engine, a risk profile for the request based on the user context data of the request and one or more of the security policies in the database; and selecting one of a plurality of available security workflows based on the risk profile, wherein the selected security workflow includes sending one or more verification communications to the user device.

* * * * *